United States Patent
Adler et al.

(10) Patent No.: US 8,739,292 B2
(45) Date of Patent: May 27, 2014

(54) TRUST EXCEPTION MANAGEMENT

(75) Inventors: Mitchell D. Adler, Cupertino, CA (US); Michael Lambertus Hubertus Brouwer, San Jose, CA (US); Conrad Sauerwald, Mountain View, CA (US)

(73) Assignee: Apple Inc., Cupertino, CA (US)

( * ) Notice: Subject to any disclaimer, the term of this patent is extended or adjusted under 35 U.S.C. 154(b) by 924 days.

(21) Appl. No.: 12/347,691

(22) Filed: Dec. 31, 2008

(65) Prior Publication Data

US 2009/0228986 A1    Sep. 10, 2009

Related U.S. Application Data

(60) Provisional application No. 61/033,758, filed on Mar. 4, 2008.

(51) Int. Cl.
*G06F 7/04* (2006.01)
*G06F 21/10* (2013.01)
*G06F 21/57* (2013.01)

(52) U.S. Cl.
CPC .......... *G06F 21/10* (2013.01); *G06F 2211/009* (2013.01); *G06F 21/57* (2013.01)
USPC ......... 726/26; 726/5; 726/21; 726/23; 726/27

(58) Field of Classification Search
CPC .... G06F 21/10; G06F 2211/009; G06F 21/57
USPC ............................................ 726/5, 21, 23, 27
See application file for complete search history.

(56) References Cited

U.S. PATENT DOCUMENTS

| | | | | |
|---|---|---|---|---|
| 5,958,050 A * | 9/1999 | Griffin et al. | .................. | 726/1 |
| 6,134,327 A * | 10/2000 | Van Oorschot | .................. | 380/30 |
| 6,321,267 B1 * | 11/2001 | Donaldson | .................. | 709/229 |
| 6,940,979 B1 * | 9/2005 | Bobbitt | .................. | 380/277 |
| 7,146,402 B2 * | 12/2006 | Kucherawy | .................. | 709/206 |
| 7,467,409 B2 * | 12/2008 | Reasor et al. | .................. | 726/22 |
| 7,769,820 B1 * | 8/2010 | Spies et al. | .................. | 709/218 |
| 7,849,495 B1 * | 12/2010 | Huang et al. | .................. | 726/1 |
| 7,881,969 B2 * | 2/2011 | Wiseman et al. | .................. | 705/26.2 |
| 8,078,866 B2 * | 12/2011 | Xiao | .................. | 713/157 |
| 2002/0078347 A1 * | 6/2002 | Hericourt et al. | .................. | 713/156 |
| 2003/0065940 A1 * | 4/2003 | Brezak et al. | .................. | 713/201 |
| 2004/0059590 A1 * | 3/2004 | Mercredi et al. | .................. | 705/1 |
| 2004/0168056 A1 * | 8/2004 | Dillaway et al. | .................. | 713/156 |
| 2004/0181665 A1 * | 9/2004 | Houser | .................. | 713/158 |
| 2004/0250075 A1 * | 12/2004 | Anthe et al. | .................. | 713/175 |
| 2005/0021969 A1 * | 1/2005 | Williams et al. | .................. | 713/176 |
| 2005/0074124 A1 * | 4/2005 | Thornton et al. | .................. | 380/277 |
| 2005/0081026 A1 * | 4/2005 | Thornton et al. | .................. | 713/156 |

(Continued)

*Primary Examiner* — Calvin Cheung
(74) *Attorney, Agent, or Firm* — Womble Carlyle Sandridge & Rice LLP

(57) ABSTRACT

A machine implemented method includes storing a first data representing a prior exception to a first trust failure (e.g., expired certificate). The prior exception may be stored as part of establishing a first communication with a data processing system (e.g., a handheld device). The first communication may not be trustworthy. The method may determine, as part of establishing a second communication with the data processing system, that a second trust failure has occurred. The second trust failure (e.g., revoked certificate) indicates that the second communication may not be trustworthy. The method may determine whether the prior exception applies to the second trust failure. If the prior exception does not apply, the data processing system determines, automatically, whether to create a new exception for the second trust failure.

9 Claims, 11 Drawing Sheets

(56) References Cited

U.S. PATENT DOCUMENTS

| | | |
|---|---|---|
| 2005/0091484 A1* | 4/2005 | Thornton et al. ............. 713/156 |
| 2005/0125319 A1* | 6/2005 | Johnson .......................... 705/30 |
| 2005/0144481 A1* | 6/2005 | Hopen et al. ................. 713/201 |
| 2005/0198287 A1* | 9/2005 | Sauve et al. ................... 709/225 |
| 2005/0228998 A1* | 10/2005 | Chan et al. .................... 713/175 |
| 2005/0278534 A1* | 12/2005 | Nadalin et al. ................ 713/175 |
| 2006/0005000 A1* | 1/2006 | King et al. ........................ 713/1 |
| 2006/0015716 A1* | 1/2006 | Thornton et al. ............. 713/155 |
| 2006/0048134 A1* | 3/2006 | Napier et al. ................. 717/169 |
| 2006/0143700 A1* | 6/2006 | Herrmann ....................... 726/14 |
| 2007/0198214 A1* | 8/2007 | Bade et al. .................... 702/182 |
| 2007/0282951 A1* | 12/2007 | Selimis et al. ................ 709/205 |
| 2008/0034204 A1* | 2/2008 | Lakshminarayanan ....... 713/158 |
| 2008/0034440 A1* | 2/2008 | Holtzman et al. .............. 726/27 |
| 2008/0072306 A1* | 3/2008 | Krasnoiarov et al. ........... 726/12 |
| 2008/0082830 A1* | 4/2008 | Goulet .......................... 713/177 |
| 2008/0109890 A1* | 5/2008 | Bahl et al. ....................... 726/11 |
| 2008/0140578 A1* | 6/2008 | Felt et al. ........................ 705/71 |
| 2008/0244257 A1* | 10/2008 | Vaid et al. ........................ 713/2 |
| 2009/0024851 A1* | 1/2009 | Andrade ....................... 713/176 |
| 2009/0172776 A1* | 7/2009 | Makagon et al. ................. 726/2 |
| 2009/0319783 A1* | 12/2009 | Thornton et al. ............. 713/156 |
| 2010/0218236 A1* | 8/2010 | Hardjono et al. ................. 726/3 |
| 2011/0060947 A1* | 3/2011 | Song et al. ...................... 714/37 |
| 2011/0107401 A1* | 5/2011 | Bhai et al. ........................ 726/4 |
| 2011/0113098 A1* | 5/2011 | Walsh et al. .................. 709/204 |

\* cited by examiner

TRUST EXCEPTION MANAGEMENT

This application claims priority to co-pending U.S. Provisional Patent Application No. 61/033,758 filed on Mar. 4, 2008, which provisional application is incorporated herein by reference in its entirety; this application claims the benefit of the provisional's filing date under 35 U.S.C. §119(e).

FIELD OF THE INVENTION

Embodiments of the invention relate to data processing systems, and more particularly, to managing trusted connections and applications of the data processing system.

SUMMARY OF THE DESCRIPTION

In one embodiment described herein, a machine implemented method includes determining, while in a first context, whether a first action is an un-trusted action and if the action is un-trusted, determining a reason for the failure to trust the first action. The method performs the un-trusted action if a first trust exception corresponds to the un-trusted action (e.g., connect to a web server), the reason for failure (e.g., expired certificate), and the first context (e.g., a web browser).

The method may also include receiving a user input indicating that the method should perform the un-trusted action, where the un-trusted action does not correspond to the first trust exception. The method may create a second trust exception corresponding to the un-trusted action, the reason for failure, and the first context, and perform the un-trusted action.

In another embodiment, a machine implemented method includes storing a first data representing a prior exception to a first trust failure (e.g., expired certificate). The prior exception may be stored as part of establishing a first communication with a data processing system (e.g., a handheld device). The first communication may not be trustworthy. The method may determine, as part of establishing a second communication with the data processing system, that a second trust failure has occurred. The second trust failure (e.g., revoked certificate) indicates that the second communication may not be trustworthy. The method may determine whether the prior exception applies to the second trust failure. If the prior exception does not apply, the data processing system determines, automatically, whether to create a new exception for the second trust failure.

Other features of the present invention will be apparent from the accompanying drawings and from the detailed description which follows.

BRIEF DESCRIPTION OF THE DRAWINGS

The present invention is illustrated by way of example and not limitation in the figures of the accompanying drawings in which like references indicate similar elements.

DETAILED DESCRIPTION

Figure 1:
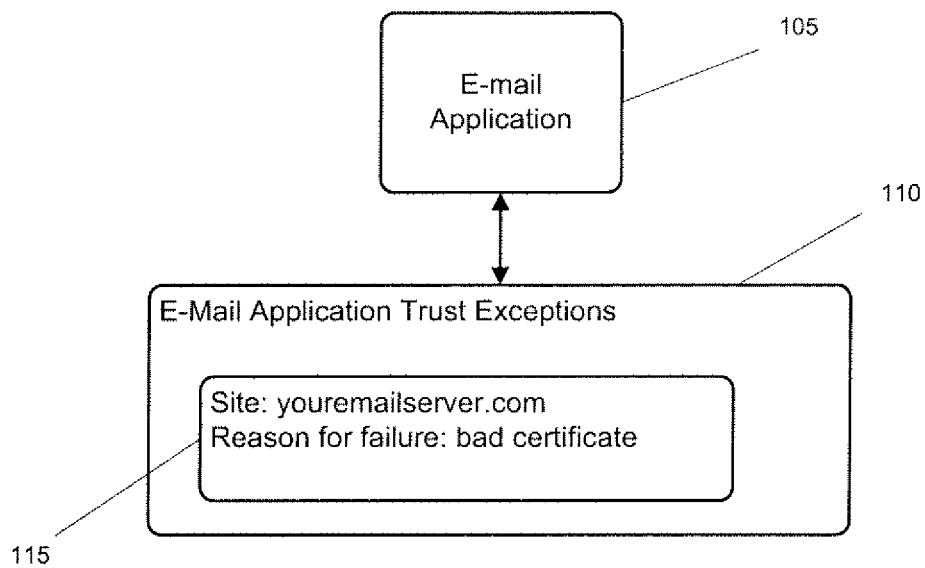
FIG. 1 shows a block diagram of one embodiment of an e-mail application and a trust exception set corresponding to the application.

Various embodiments and aspects of the inventions will be described with reference to details discussed below, and the accompanying drawings will illustrate the various embodiments. The following description and drawings are illustrative of the invention and are not to be construed as limiting the invention. Numerous specific details are described to provide a thorough understanding of various embodiments of the present invention. However, in certain instances, well-known or conventional details are not described in order to provide a concise discussion of embodiments of the present inventions.

Reference in the specification to one embodiment or an embodiment means that a particular feature, structure or characteristic described in connection with the embodiment is included in at least one embodiment of the invention. The appearance of the phrase "in one embodiment" in various places in the specification do not necessarily refer to the same embodiment.

Unless specifically stated otherwise, it is appreciated that throughout the description, discussions utilizing terms such as "processing" or "computing" or "calculating" or "determining" or "displaying" or the like, refer to the action and processes of a data processing system, or similar electronic computing device, that manipulates and transforms data represented as physical (electronic) quantities within the computer system's registers and memories into other data similarly represented as physical quantities within the computer system memories or registers or other such information storage, transmission or display devices.

The algorithms and displays presented herein are not inherently related to any particular computer or other apparatus. Various general-purpose systems may be used with programs in accordance with the teachings herein, or it may prove convenient to construct more specialized apparatus to perform the required machine-implemented method operations. The required structure for a variety of these systems will appear from the description below. In addition, embodiments of the present invention are not described with reference to any particular programming language. It will be appreciated that a variety of programming languages may be used to implement the teachings of embodiments of the invention as described herein.

At least certain embodiments of the inventions may be part of a digital media player, such as a portable music and/or video media player, which may include a media processing system to present the media, a storage device to store the media and may further include a radio frequency (RF) transceiver (e.g., an RF transceiver for a cellular telephone) coupled with an antenna system and the media processing system. In certain embodiments, media stored on a remote storage device may be transmitted to the media player through the RF transceiver. The media may be, for example, one or more of music or other audio, still pictures, or motion pictures.

The portable media player may include a media selection device, such as a touch screen input device, pushbutton device, movable pointing input device or other input device. The media selection device may be used to select the media stored on the storage device and/or the remote storage device. The portable media player may, in at least certain embodiments, include a display device which is coupled to the media processing system to display titles or other indicators of media being selected trough the input device and being presented, either through a speaker or earphone(s), or on the display device, or on both display device and a speaker or earphone(s).

Embodiments of the inventions described herein may be part of other types of data processing systems, such as, for example, entertainment systems or personal digital assistants (PDAs), or general purpose computer systems, or special purpose computer systems, or an embedded device within another device, or cellular telephones which do not include media players, or devices which combine aspects or functions of these devices (e.g., a media player, such as an iPod®, combined with a PDA, an entertainment system, and a cellular telephone in one portable device), or devices or consumer electronic products which include a multi-touch input device such as a multi-touch handheld device or a cell phone and handheld computer with a multi-touch input device.

FIG. 1 shows a block diagram of one embodiment of an e-mail application and a trust exception set corresponding to the application. E-mail application 105 accesses trust exceptions 110, which includes trust exception 115. In one embodiment, trust exceptions 110 may be a database of trust exceptions such as trust exception 115. In one embodiment, trust exceptions 110 may be a flat text file or other data structure. In one embodiment, trust exception 115 includes a domain name or IP address of a networked data processing system accessed by application 105 and a reason for failure indicating why the application 105 could not access the networked system. In one embodiment, the reason for failure can be any failure or warning value included in the Transport Layer Security (TLS) protocol or Secure Sockets Layer (SSL) protocol, such as certificate revoked, certificate expired, etc. In one embodiment, a device cannot execute an application until a trust system has verified the code image corresponding to the application. Verification may fail for reasons like those above or other reasons. One embodiment creates trust exceptions for applications installed on a device, in order to allow execution of the application on the device despite local or remote verification failure of the application code image.

Figure 2:
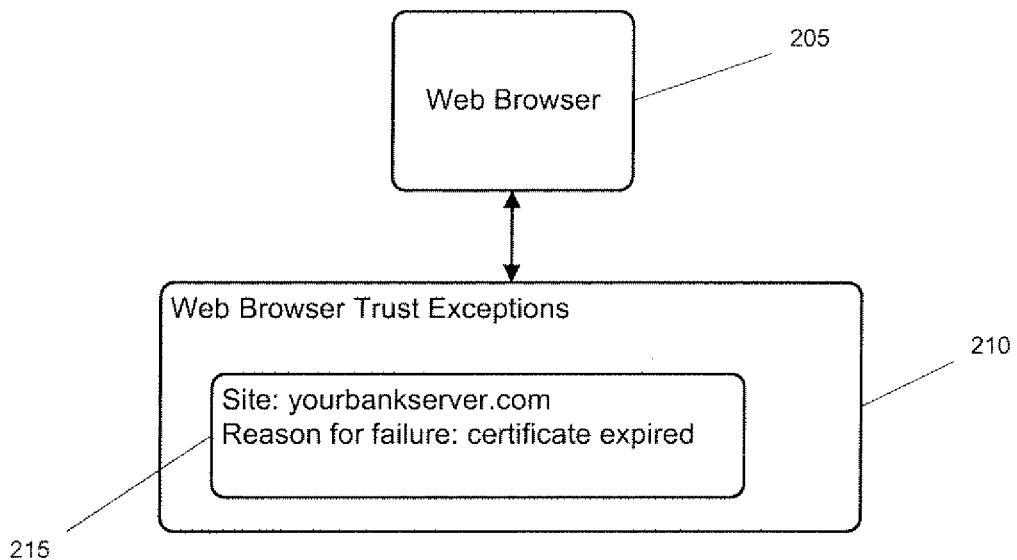
FIG. 2 shows a block diagram of one embodiment of a web browser and a trust exception set corresponding to the web browser.

FIG. 2 shows a block diagram of one embodiment of a web browser and a trust exception set corresponding to the web browser. Web browser 205 connects to and accesses web browser trust exceptions 210, which includes trust exception 215. In one embodiment, a web browser is a context for trust exception management. In another embodiment, different tasks within a web browser or other application each constitute separate contexts for trust exception management. For example, accessing a secure banking website to view private bank records may be a context separate from accessing a secure banking website to access stock quotes. Context-based trust exception management accommodates the various demands for privacy and security that may change depending on the context in which a user application performs an action. For example, a user may be willing to accept an expired certificate in one context, but not in another. Context may be specified by a protocol (e.g., https), an application (e.g., web browser), user configuration (e.g., user creates contexts).

In one embodiment, trust exception 215 includes a reason for failure. As described below in greater detail in conjunction with FIGS. 3 and 4, a reason for failure allows better management of trust exceptions by differentiating between new trust failures in a current context and previously encountered trust failures in the current context, or other contexts. For example, the user may have made an exception for an expired certificate in the context of an e-mail server. When a new failure caused by a certificate not matching the e-mail server domain name is received, the user would be informed of the new failure. In one embodiment, some reasons for failure are ranked according to severity. For example, a trust system may consider a revoked certificate to be more serious than an expired certificate. In one embodiment, creating a trust exception for a more serious trust failure provides an umbrella exception for less serious failures. In another embodiment, a trust failure may be ignored only if a trust exception exactly matches the trust failure. In still another embodiment, the user specifies whether an exception will be used as an umbrella exception.

Figure 3:
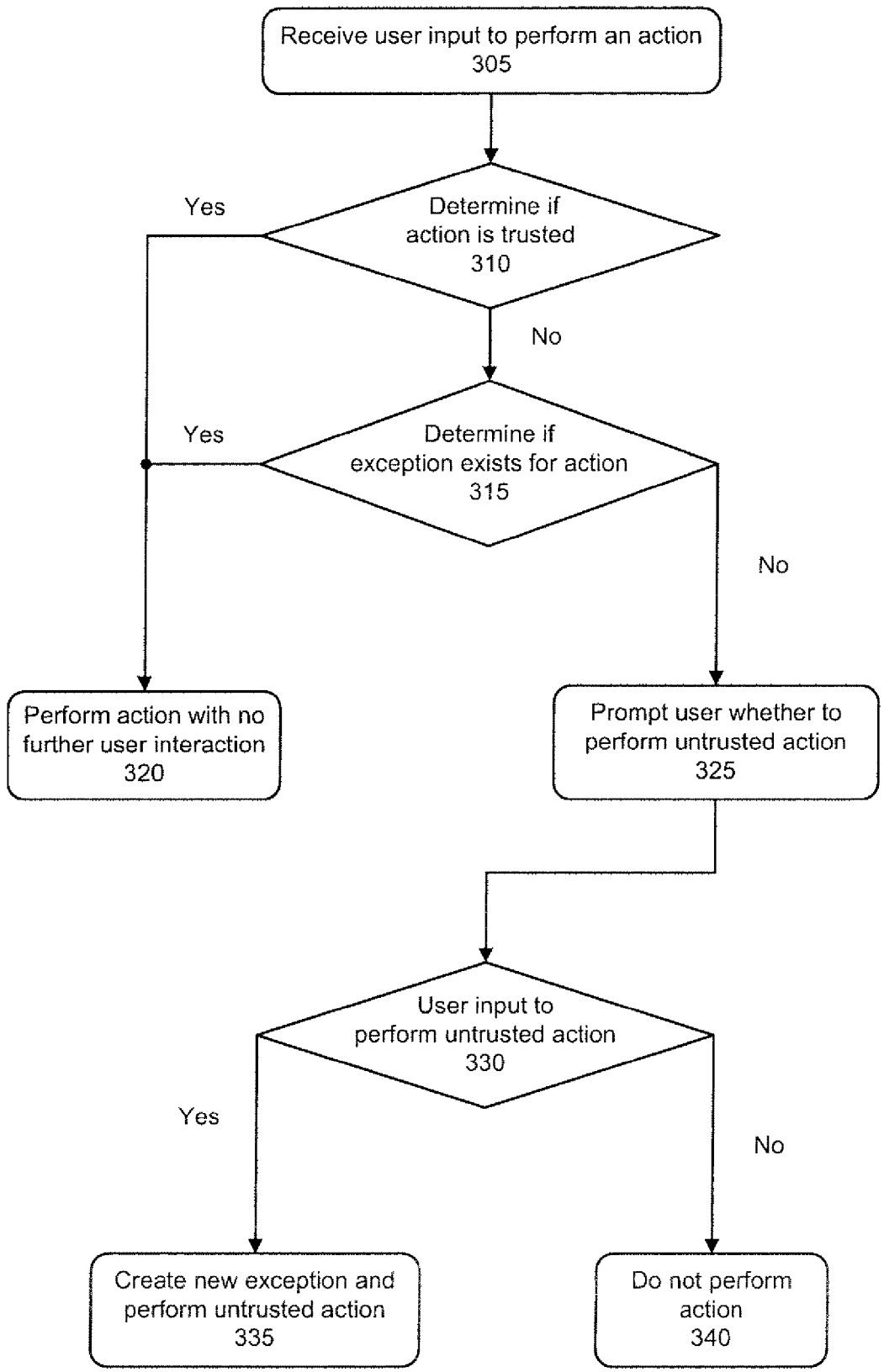
FIG. 3 shows a flow chart of one embodiment of a method of managing trust exceptions.

FIG. 3 is a flow chart of one embodiment of a method of managing trust exceptions. At block 305, the method receives a user input requesting that, for example, a user application perform an action. At decision 310, the method determines whether the action is a trusted action. In one embodiment, a trust system determines whether the action is a trusted action. In one embodiment, the trust system might use known techniques to verify a certificate signing a website the user seeks to access. In one embodiment, the trust system might use known techniques to verify a signed application downloaded from a third party.

Figure 6:
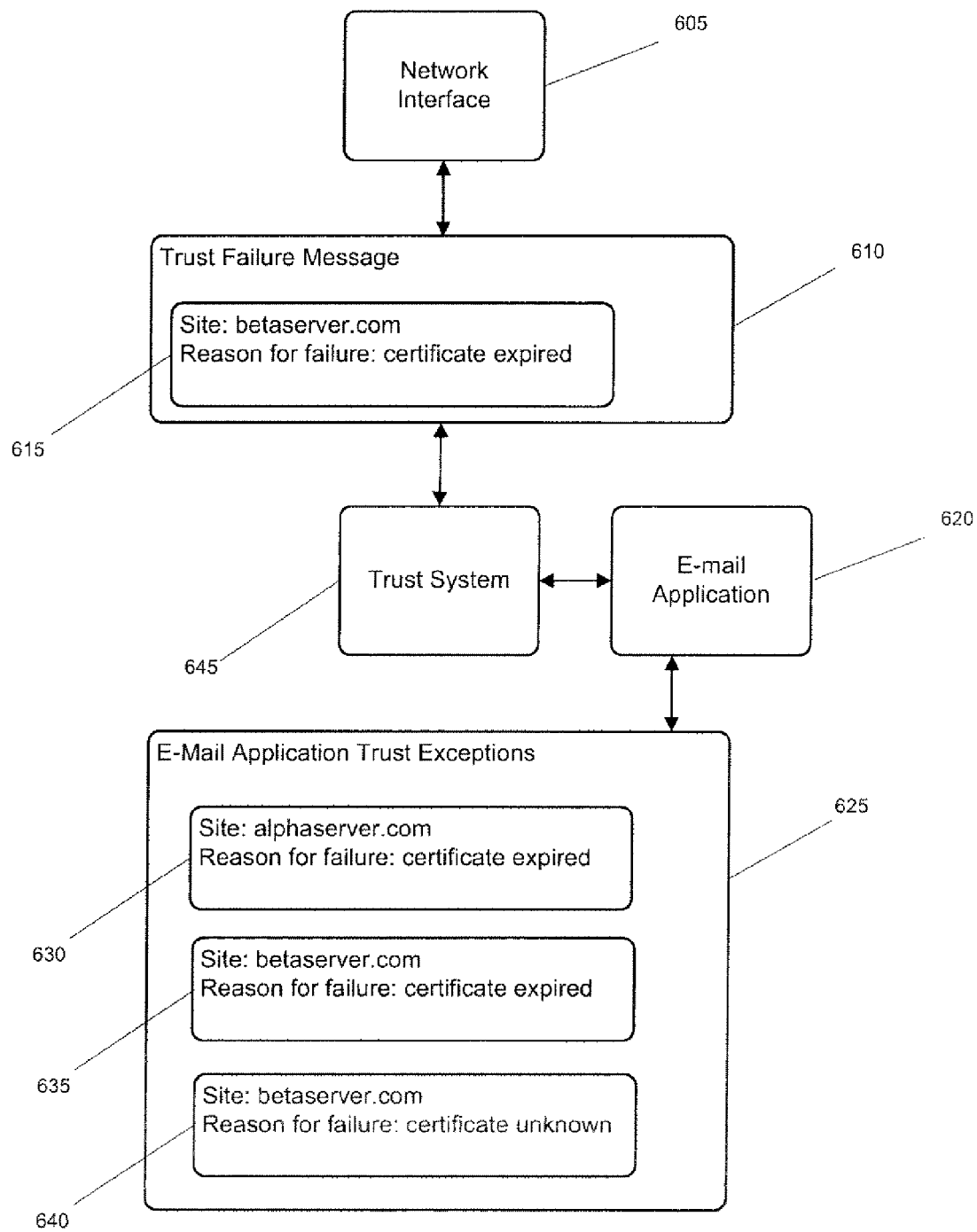
FIG. 6 shows a block diagram of one embodiment of an e-mail application and a trust failure message in a first state.
Figure 7:
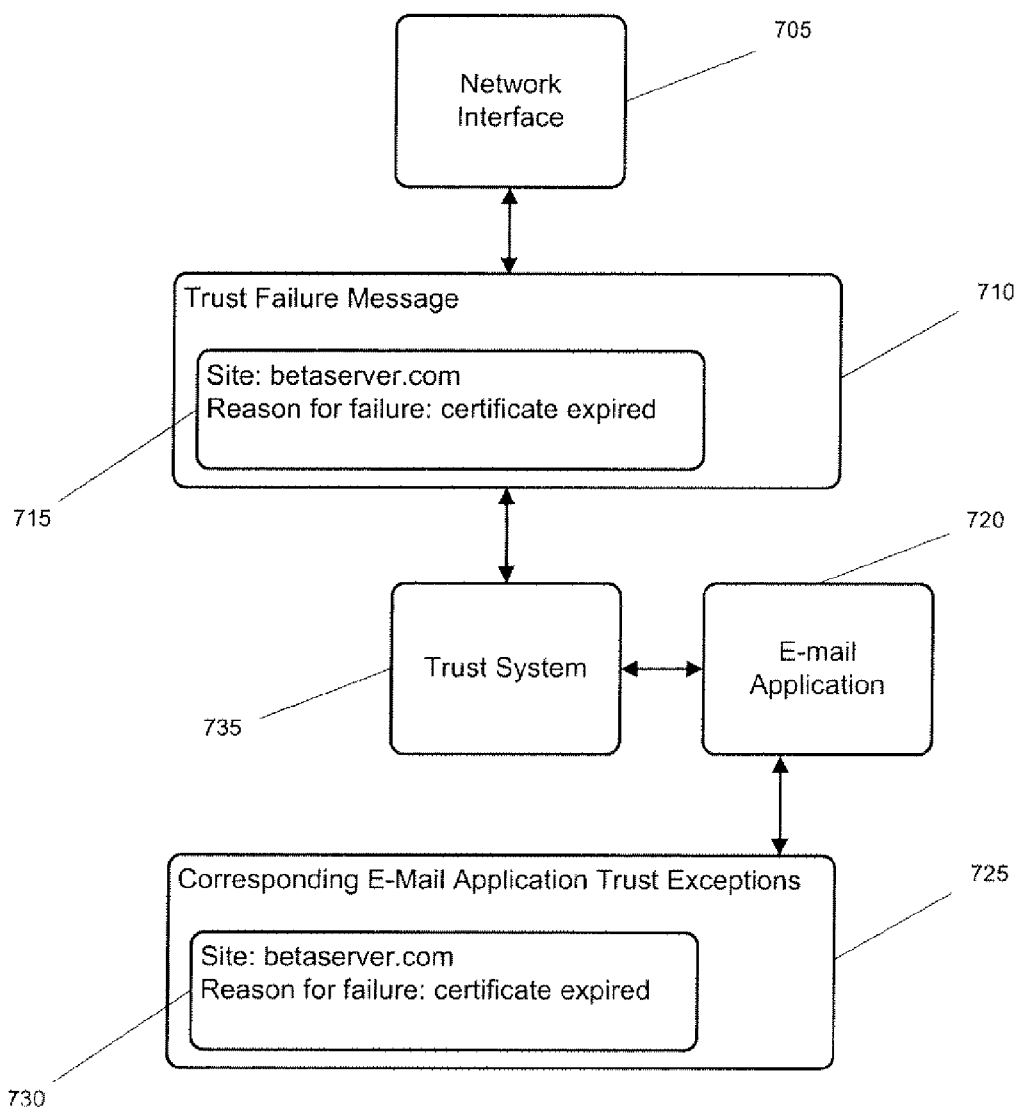
FIG. 7 shows a block diagram of one embodiment of an email application and a trust failure message in a second state.

If the method determines that the action is trusted, the method performs the action at block 320 without further user interaction. For example, a user may seek to connect to a secure banking website. The method determines that the website certificate is in good order and may be trusted and allows the connection to the website without revealing the analysis of the website's trustworthiness to the user. If the method determines that the action is not trustworthy, the method then determines at decision 315 if a trust exception, such as trust exception 215, exists for the current action and reason for failure. For example, FIGS. 6 and 7 illustrate locating a corresponding trust exception, allowing the method to proceed to block 320 and perform the desired action.

Figure 8:
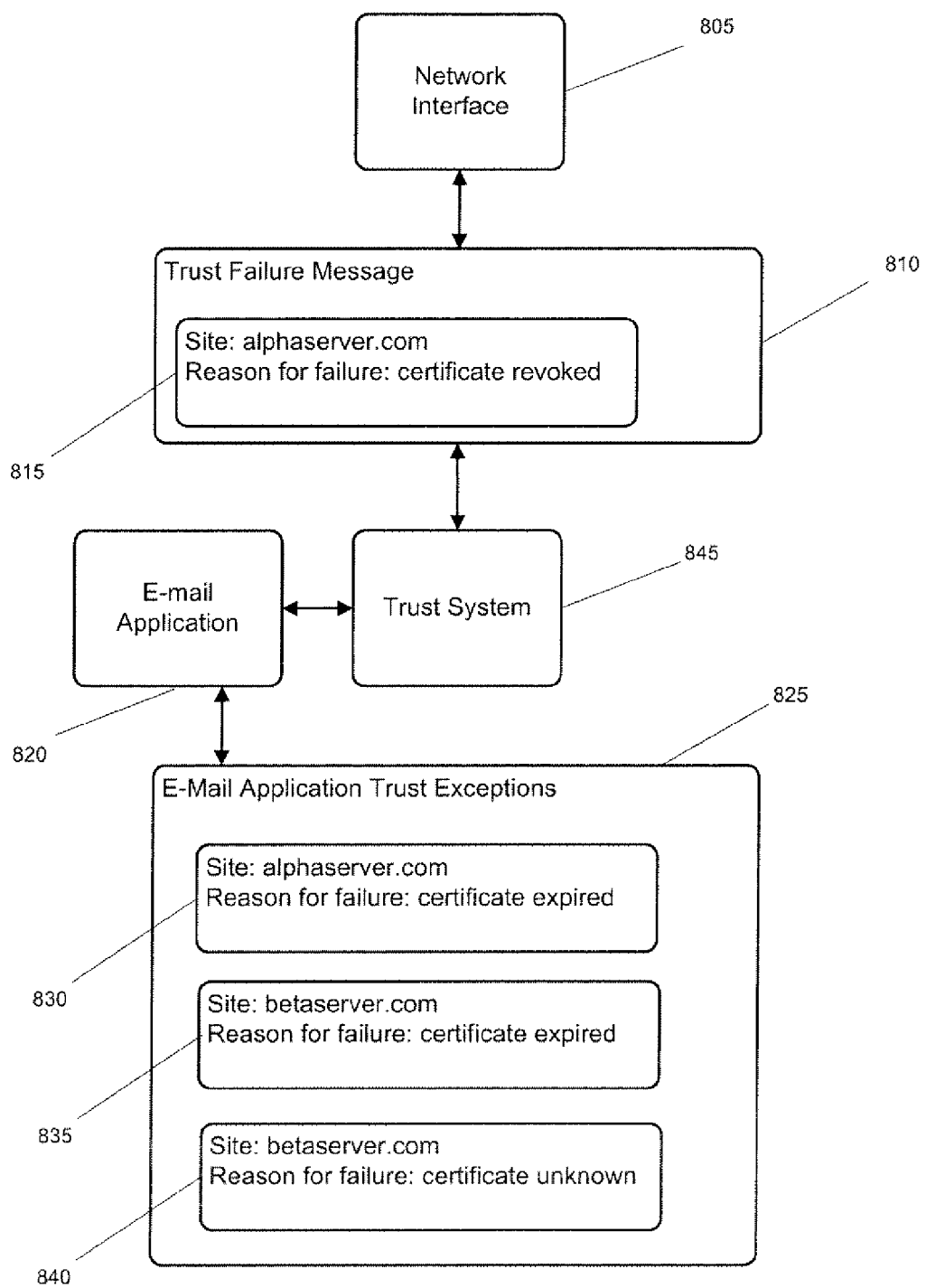
FIG. 8 shows a block diagram of another embodiment of an e-mail application and a trust failure message in a first state.
Figure 9:
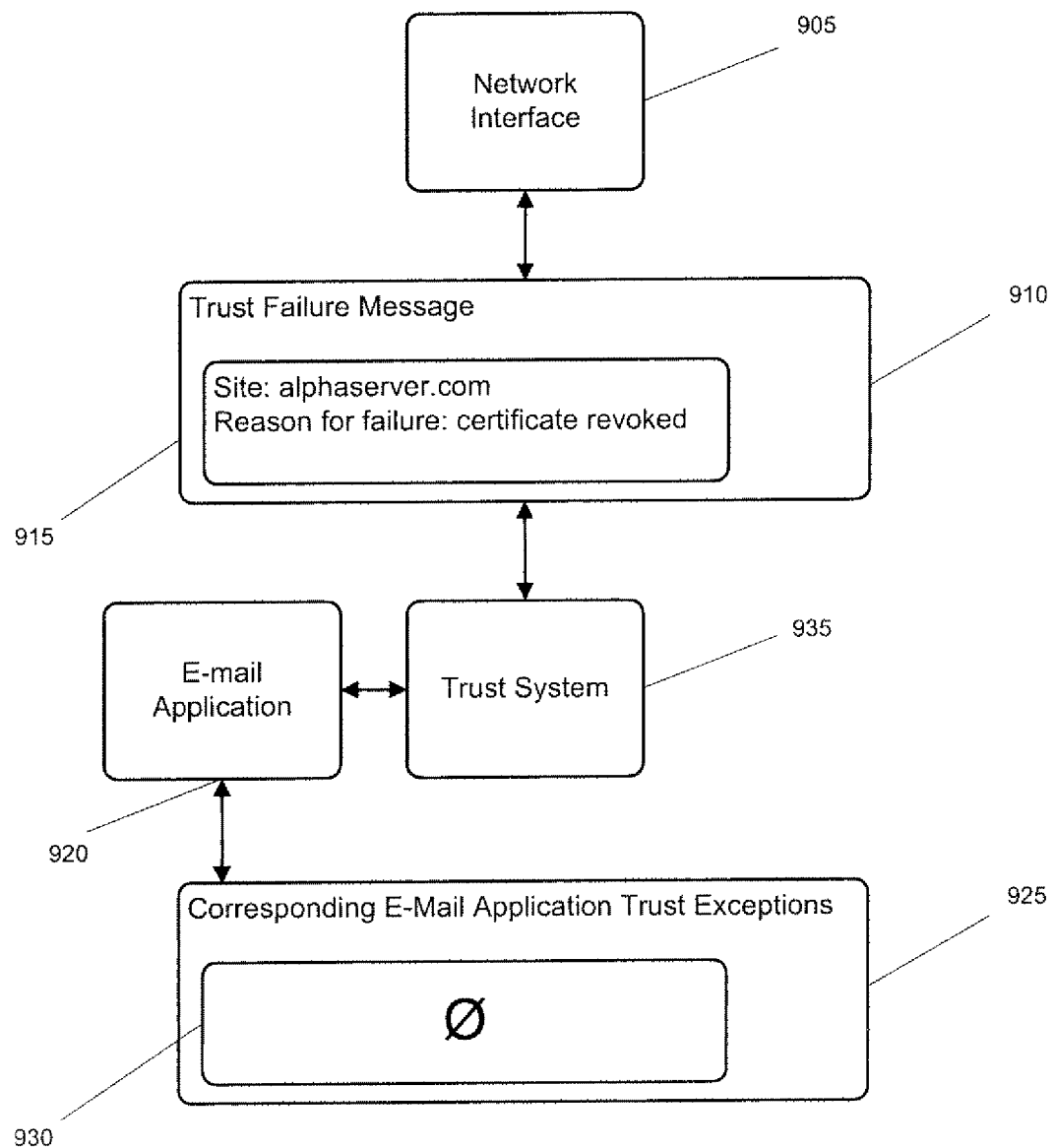
FIG. 9 shows a block diagram of the another embodiment of an e-mail application and a trust failure message in a second state.

If, as illustrated in FIGS. 8 and 9, no corresponding trust exception exists for the un-trusted action, the method proceeds to block 325 and prompts the user to indicate whether the method should allow performance of the un-trusted action. At block 330, the method determines if the user wishes to perform the un-trusted action despite the trust failure. If the user indicates to perform the un-trusted action, the method, at block 335, creates a new trust exception for the failure and action and then performs the un-trusted action. Otherwise, the method, at block 340, does not perform the un-trusted action. In one embodiment, creation of a new trust exception allows a user to adjust settings related to the trust exception. For example, the user may indicate that the trust exception is only for the current case, not for later use (e.g., the user will be prompted if the failure occurs again). For example, the user may indicate that the trust exception is to be stored, but to remind the user if the method encounters the failure again in the future. For example, the user may indicate that the trust exception applies in contexts other than the user's current context, such as a web browser context in addition to the e-mail context in which the method creates the exception.

Figure 4:
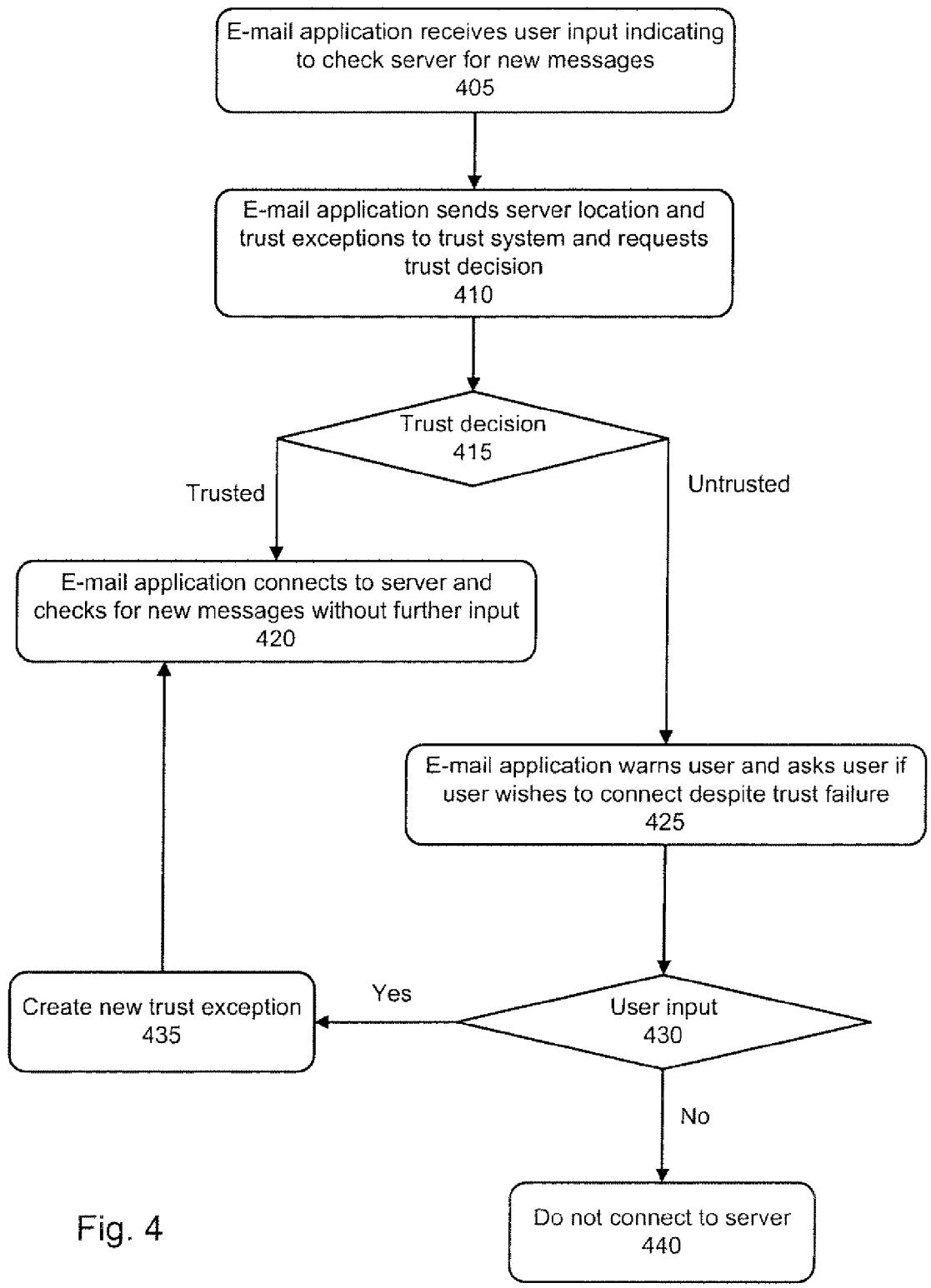
FIG. 4 shows a flow chart of one embodiment of a method of managing trust exceptions in an e-mail application.

FIG. 4 shows a flow chart of one embodiment of a method of managing trust exceptions in an e-mail application. At block 405, the method, executing in the context of an e-mail application, receives user input indicating that the e-mail application should connect to the e-mail server and check for new e-mail messages. In one embodiment, the user input sets a periodic timer on the e-mail application that causes the e-mail application to check for new messages whenever the designated time interval elapses. At block 410, the method sends the location of the e-mail server and the e-mail application's set of trust exceptions to the trust system and requests a trust decision. In one embodiment, the e-mail application sends a memory reference to a data structure containing the trust exceptions. In one embodiment, the e-mail application sends a filename to the trust system.

If at decision 415, the trust system indicates that the server location is trustworthy, the method at block 420 connects to the server and checks for new e-mail messages without requiring further action from the user. In one embodiment, the trust decision will indicate that the server can be trusted if the server certificate is trusted or if a trust exception exists. In one embodiment, the content of the trust decision may differ if the trust system does not trust the server but locates a corresponding exception, versus being trusted, as described in greater detail below in conjunction with FIG. 5A. If the trust decision indicates that the server cannot be trusted, the method at block 425 warns the user and asks the user if the user wishes to connect to the server despite the failure of trust. If at decision 430 the user input requires connecting to the server despite the trust failure, the method creates a new trust exception at block 435. At block 420, the method connects to the server and checks for new messages. Otherwise, at block 440, the method does not connect to the server.

Figure 5A:
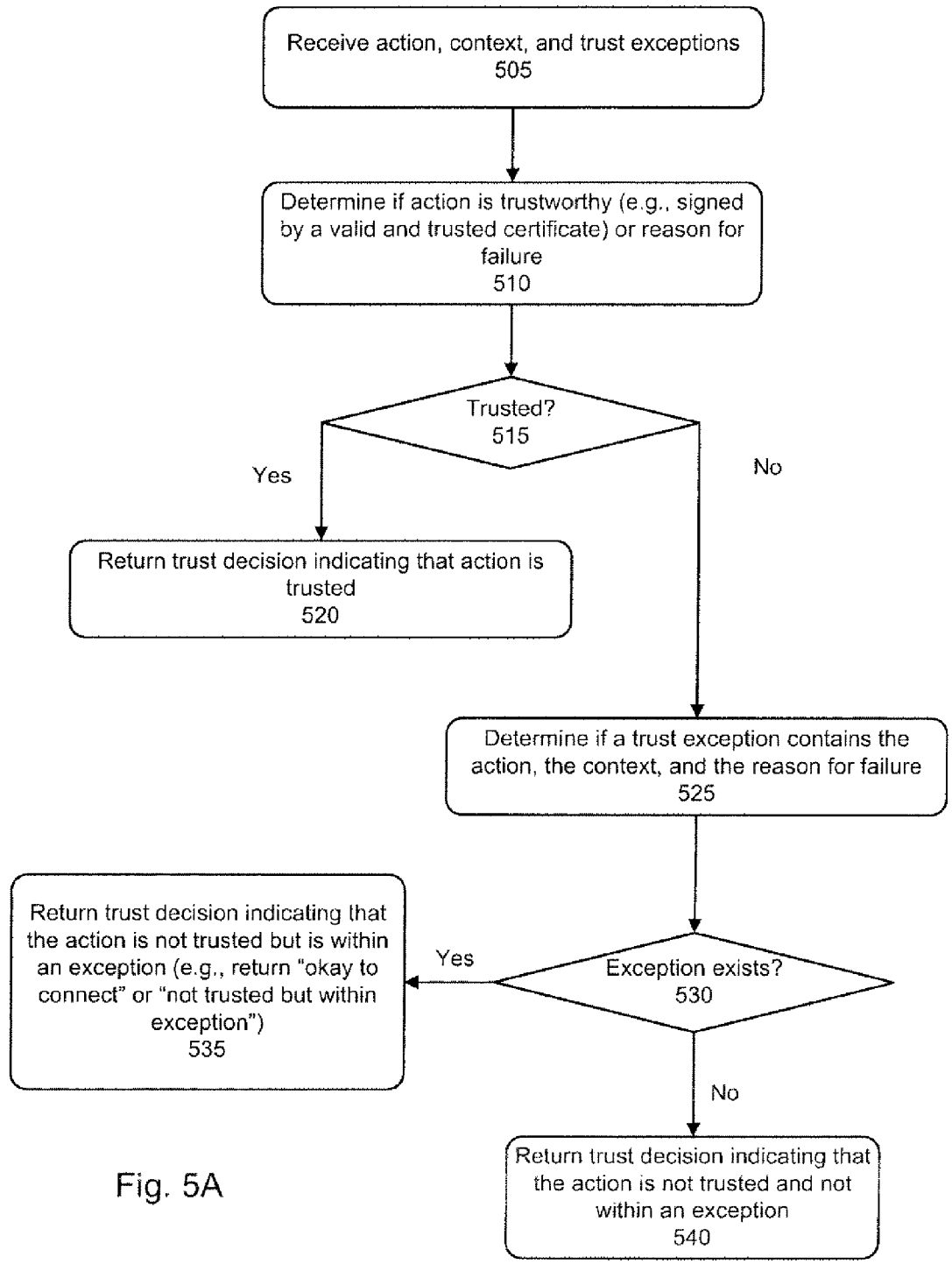
FIG. 5A shows a flow chart of one embodiment of a method of applying trust exceptions.

FIG. 5A is a flow chart of one embodiment of a method of applying trust exceptions. At block 505, the method receives an action, context, and trust exceptions. In one embodiment, the method receives context indirectly. For example, context may be defined by the set of trust exceptions (e.g., all trust exceptions associated with a web browser). Trust exceptions may also reside in a global store or database, and include a context designation, allowing the method to discern between trust exceptions belonging to one or more contexts. At block 510, the method determines if the action is trustworthy and, if not, the reason for trust failure. In one embodiment, the action corresponds to connecting to a secured server and determining if the connection is trustworthy corresponds to verifying that a trusted signature authority validly signs the server's certificate.

If at decision 515 the method has determined that the action is trusted, the method at block 520 returns a trust decision indicating that the action is trusted. Otherwise, the method determines at block 525 if a trust exception received at block 505 contains the action, the context, and the reason for failure. If at decision 530 the method has determined that a trust exception matches the current action-context-failure tuple, the method at block 535 returns a trust decision indicating that the action is trusted. Block 535 may be performed automatically by the system without requiring the user to authorize application of the trust exception. Otherwise, at block 540 the method returns a trust decision indicating that the action is not trusted and not within an exception and the user may be requested to device whether or not to accept the action (and hence implicitly to trust the action). In one embodiment, the trust decision specifies that the action is not trusted but corresponds to an existing trust exception. In another embodiment, the trust decision merely specifies that the action is trusted. In one embodiment, an action is verifying the code image of a new application on a device.

Figure 5B:
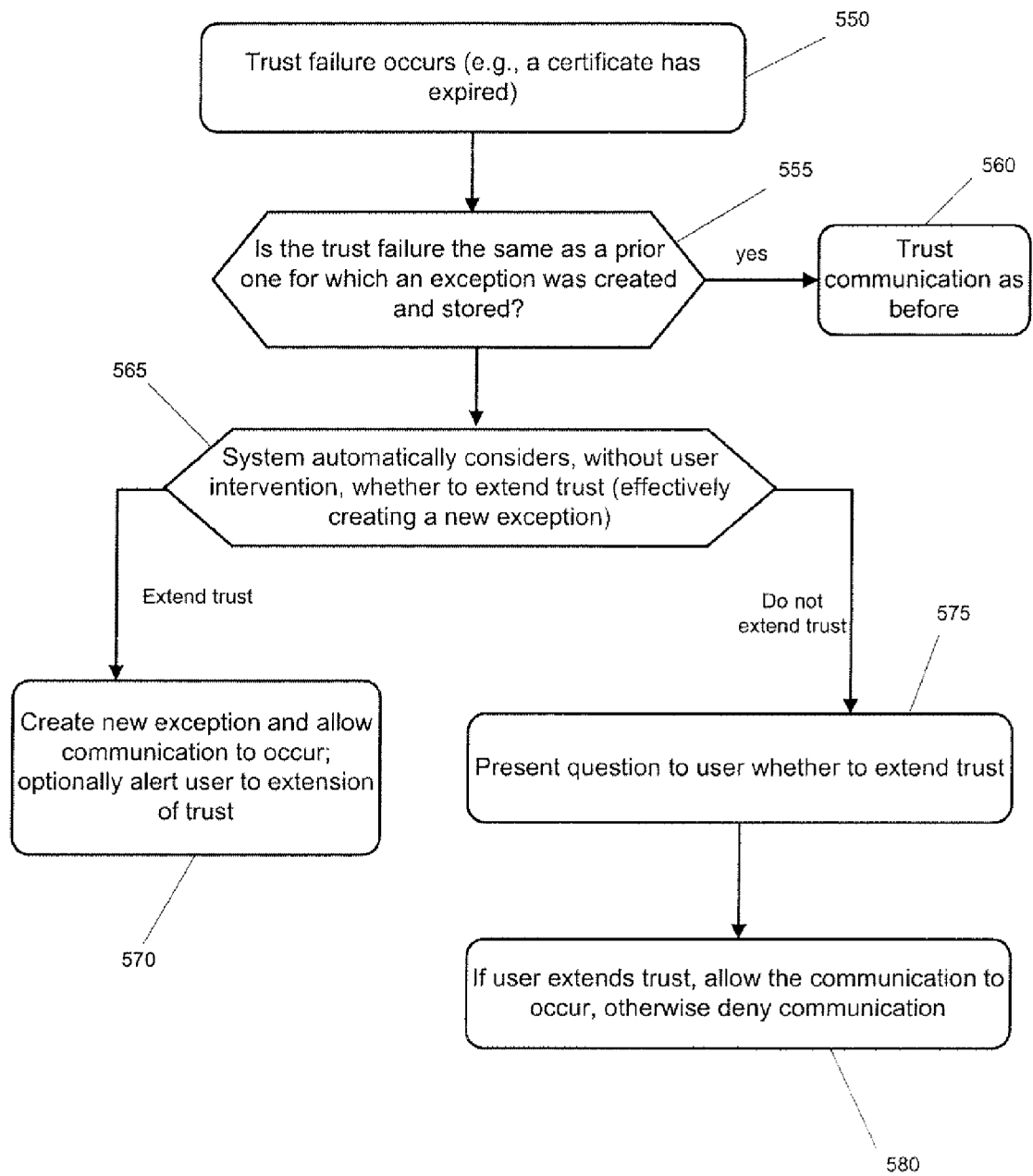
FIG. 5B shows a flow chart of an embodiment in which a data processing system decides whether to extend a trust exception.

FIG. 5B shows an example of an embodiment of the invention in which a trust exception is extended with at least the assistance of a data processing system. The assistance can be completely automatic and performed by the system and not require any user intervention or interaction. The user may be unaware of the assistance or the assistance may involve a recommendation requiring the user to accept or deny the recommendation. The assistance may be performed by a client data processing system or a server data processing system or a combination of both systems. In a preferred embodiment, a client data processing system stores information about prior trust failures and trust exceptions created for those trust failures in order to decide whether to extend a trust exception, thereby creating, in effect, a new trust exception (e.g., the system may extend an exception for an expired certificate, but not a revoked certificate).

In operation 550, a data processing system determines that a trust failure has occurred; for example, in the process of establishing a secure (e.g., authenticated and encrypted) communication with a remote server, the data processing system has determined that a digital certificate associated with that remote server has expired. In operation 555, the data processing system determines whether a previously created and stored trust exception applies to this trust failure which was determined in operation 550. If the previously created and stored trust exception does apply (e.g., it is the same trust failure), then the communication is allowed to be established and is trusted as before (in operation 560). However, if it is determined in operation 555 that the trust failure determined in operation 550 is different than a trust failure for which a trust exception was created, then processing proceeds to operation 565. In operation 565, the data processing system determines whether to extend a trust exception, thereby creating, in effect, a new trust exception for the current context. Operation 565 can be performed automatically without input or intervention from the user and the user may not be aware that an automatic trust extension is being considered; in other embodiments, the data processing system may provide an alert or message which tells the user that it is considering (or has decided) whether to extend a trust exception or the data processing system may make a decision but provide the user with an opportunity to accept or deny the trust extension, and this decision may be considered a recommendation to extend trust.

The data processing system, in operation 565, can consider the context of the failure, the reason for the failure and the nature of the action or communication when determining whether to extend trust automatically. If, in operation 565, the system decides to extend trust, then in operation 570, the system creates and stores an extended trust exception which may be a new trust exception and allows the communication to occur. The system can, optionally, alert the user that the communication has been trusted even though the prior exception, in this context, etc., did not apply. If in operation 565, the system decides not to extend trust, then the system presents, in operation 575, a user interface to the user to ask the user whether or not to extend trust to this communication.

If the user, through the user interface, extends trust for the communication, then the communication is allowed and the trust exception is updated to indicate that, in the current context and action, the communication can be trusted; this updated trust exception is stored and used in future sessions in which a communication is tested/established for trust. In this manner, a trust exception can be incrementally changed over time and used in future automatic extensions of trust as shown in FIG. 5B. In one embodiment, a data processing system is pre-configured with default rules for deciding when to automatically extend a trust exception. A data processing system may also provide a user interface through which a user may configure rules for automatically extending a trust exception.

FIG. 6 shows a block diagram of one embodiment of an e-mail application and a trust failure message in a first state. E-mail application 620 communicates the location of the e-mail server and contextually relevant trust exceptions 625 to trust system 645 to obtain a trust decision. Through network interface 605, trust system 645 determines if the e-mail server betaserver.com is trusted. Trust failure message 610 received by trust system 645 through network interface 605 reports in message 615 that the site betaserver.com is not trusted and the reason for the trust failure is that betaserver.com's certificate has expired. Trust system 645 iterates through trust exceptions 630, 635, and 640, as illustrated at block 525 in FIG. 5A.

Turning to FIG. 7, trust system 735 identifies trust exception 730 in contextually relevant trust exceptions 725. The site betaserver.com occurs in both the trust exception 730 and the trust failure 715 received through network interface 705 as a result of e-mail application 720's request for a trusted connection to the site betaserver.com. The reason for failure in message 715, certificate expired, also corresponds to the reason for failure within exception 730. Thus, trust exception 725 includes a matching exception 730 for trust failure message 710. Referring to FIG. 5A, the method at block 535 returns a trust decision indicating that the action is trusted.

FIG. 8 shows a block diagram of another embodiment of an e-mail application and a trust failure message in a first state. E-mail application 820 requests a trust decision from trust system 845 regarding whether application 820 may safely connect to alphaserver.com in order to check for new e-mail messages. Application 820 provides contextually relevant trust exceptions 825 to trust system 845. Trust system 845, through network interface 805, determines whether alphaserver.com is trusted. Trust system 845 receives trust failure message 810, containing message 815 indicating that alphaserver.com is not trusted because a signing authority has revoked its certificate. Trust system 845 iterates through trust exceptions 830, 835, and 840.

Turning to FIG. 9, trust system 935's search through exceptions 925 to find an exception corresponding to message 915 has returned an empty set 930. Trust system 935 will report trust failure message 910 to e-mail application 920 as in block 540 of FIG. 5A. Thus, in order for application 920 to connect to alphaserver.com over network interface 905, the method illustrated in FIG. 4 must receive user input at block 425 requiring that the application 920 connect to alphaserver.com despite the failure without an exception 915. In one embodiment, network interface 905 may be a USB connection or cellular data network connection.

Figure 10:
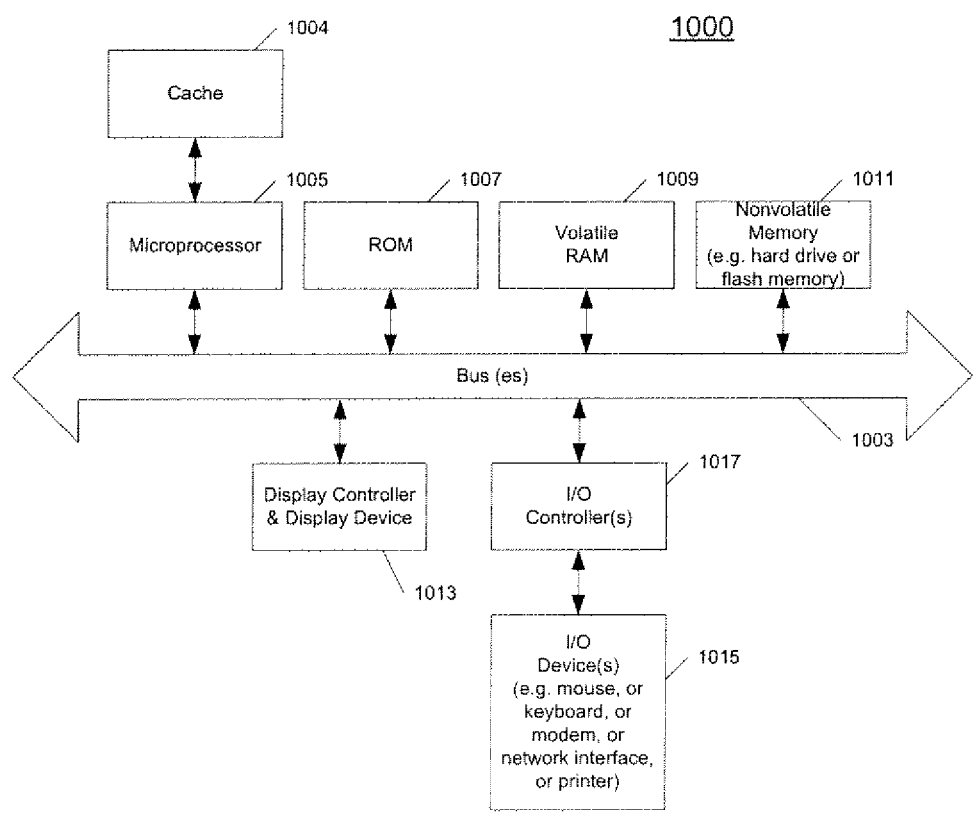
FIG. 10 shows one example of a typical computer system which may be used in conjunction with the embodiments described herein.

FIG. 10 shows one example of a data processing system that may be used with one embodiment the present invention. Note that while FIG. 10 illustrates various components of a computer system, it is not intended to represent any particular architecture or manner of interconnecting the components as such details are not germane to the present invention. It will also be appreciated that network computers and other data processing systems which have fewer components or perhaps more components may also be used with the present invention.

As shown in FIG. 10, the computer system 1000, which is a form of a data processing system, includes a bus 1003 which is coupled to a microprocessor(s) 1005 and a ROM (Read Only Memory) 1007 and volatile RAM 1009 and a non-volatile memory 1011. The microprocessor 1005 is coupled to cache 1004. The microprocessor 1005 may retrieve the instructions from the memories 1007, 1009, 1011 and execute the instructions to perform operations described above. The bus 1003 interconnects these various components together and also interconnects these components 1005, 1007, 1009, and 1011 to a display controller and display device 1013 and to peripheral devices such as input/output (I/O) devices which may be mice, keyboards, modems, network interfaces, printers and other devices which are well known in the art. Typically, the input/output devices 1015 are coupled to the system through input/output controllers 1017. The volatile RAM (Random Access Memory) 1009 is typically implemented as dynamic RAM (DRAM) which requires power continually in order to refresh or maintain the data in the memory.

The mass storage 1011 is typically a magnetic hard drive or a magnetic optical drive or an optical drive or a DVD RAM or a flash memory or other types of memory systems which maintain data (e.g. large amounts of data) even after power is removed from the system. Typically, the mass storage 1011 will also be a random access memory although this is not required. While FIG. 10 shows that the mass storage 1011 is a local device coupled directly to the rest of the components in the data processing system, it will be appreciated that the present invention may utilize a nonvolatile memory which is remote from the system, such as a network storage device which is coupled to the data processing system through a network interface such as a modem, an Ethernet interface or a wireless network. The bus 1003 may include one or more buses connected to each other through various bridges, controllers and/or adapters as is well known in the art.

The term "memory" as used herein is intended to encompass all volatile storage media, such as dynamic random access memory (DRAM) and static RAM (SRAM). Computer-executable instructions can be stored on non-volatile storage devices, such as magnetic hard disk, an optical disk, and are typically written, by a direct memory access process, into memory during execution of software by a processor. One of skill in the art will immediately recognize that the term "machine-readable storage medium" includes any type of volatile or nonvolatile storage device that is accessible by a processor.

Figure 11:
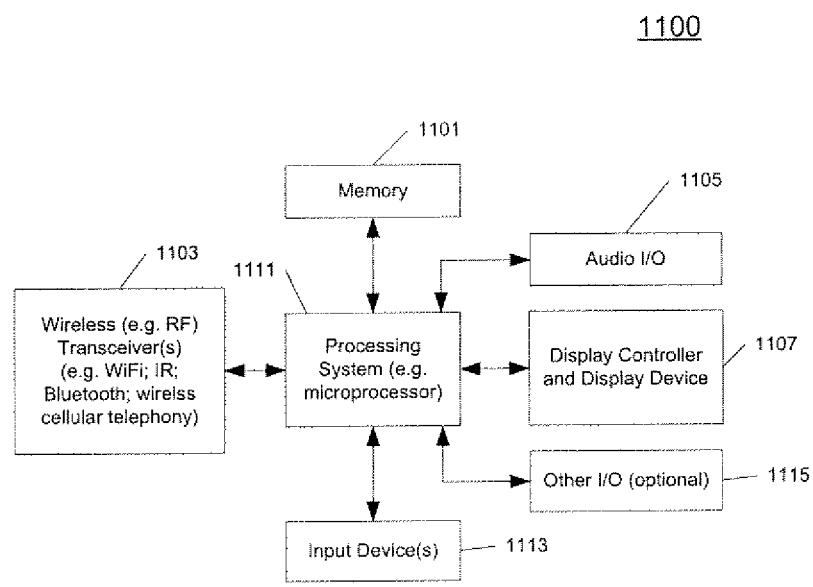
FIG. 11 shows one example of a data processing system which may be used in conjunction with the embodiments described herein.

FIG. 11 shows an example of another data processing system which may be used with one embodiment of the present invention. The data processing system 1100 shown in FIG. 11 includes a processing system 1111, which may be one or more microprocessors, or which may be a system on a chip integrated circuit, and the system also includes memory 1101 for storing data and programs for execution by the processing system. The system 1100 also includes an audio input/output subsystem 1105 which may include a microphone and a speaker for, for example playing back music or providing telephone functionality through the speaker and microphone.

A display controller and display device 1107 provide a visual user interface for the user; this digital interface may include a graphical user interface which is similar to that shown on a Macintosh computer when running OS X operating system software. The system 1100 also includes one or more wireless transceivers 1103 to communicate with another data processing system, such as the system 1000 of FIG. 10. A wireless transceiver may be a WiFi transceiver, an infrared transceiver, a Bluetooth transceiver, and/or a wireless cellular telephony transceiver. It will be appreciated that additional components, not shown, may also be part of the system 1100 in certain embodiments, and in certain embodiments fewer components than shown in FIG. 11 may also be used in a data processing system.

The data processing system 1100 also includes one or more input devices 1113 which are provided to allow a user to provide input to the system. These input devices may be a keypad or a keyboard or a touch panel or a multi touch panel The data processing system 1100 also includes an optional input/output device 1115 which may be a connector for a dock. It will be appreciated that one or more buses, not shown, may be used to interconnect the various components as is well known in the art. The data processing system shown in FIG. 11 may be a handheld computer or a personal digital assistant (PDA), or a cellular telephone with PDA like functionality, or a handheld computer which includes a cellular telephone, or a media player, such as an iPod, or devices which combine aspects or functions of these devices, such as a media player combined with a PDA and a cellular telephone in one device. In other embodiments the data processing system 1100 may be a network computer or an embedded processing device within another device, or other types of data processing systems which have fewer components or perhaps more components than that shown in FIG. 11.

In the foregoing specification, the invention has been described with reference to specific exemplary embodiments thereof. It will be evident that various modifications may be made thereto without departing from the broader spirit and scope of the invention as set forth in the following claims. The specification and drawings are, accordingly, to be regarded in an illustrative sense rather than a restrictive sense.

What is claimed is:

1. A machine implemented method, comprising:
storing, in a memory of a data processing system, a first data representing a first exception to a first trust failure, wherein the first trust failure indicates, prior to establishing a first communication with the data processing system, that the first communication is untrustworthy, and the first exception allows the data processing system to establish the untrustworthy first communication;
determining, by the data processing system and as part of establishing a second communication with the data processing system, that a second trust failure has occurred, the second trust failure indicating that the second communication is untrustworthy; and
creating, automatically by the data processing system, a second exception for the second trust failure in response to determining that the first exception applies to the second trust failure, wherein the second exception allows establishing the untrustworthy second communication.

2. The method as in claim 1, wherein the data processing system determines whether to create the second exception without requiring user interaction to create the second exception.

3. The method as in claim 2, wherein the data processing system determines whether to create the second exception by comparing the first trust failure and the second trust failure, and the comparing comprises comparing a context of the first trust failure and a context of the second trust failure.

4. A machine-readable non-transitory storage medium storing instructions that, when executed by a processor included in a data processing system, cause the data processing system to perform a method of processing data, the method comprising:
storing first data representing a first exception to a first trust failure, the first trust failure indicating, prior to establishing a first communication with the data processing system, that the first communication is untrustworthy, wherein the first exception allows the data processing system to establish the untrustworthy first communication;
determining, as part of establishing a second communication with the data processing system, that a second trust failure has occurred, the second trust failure indicating that the second communication is untrustworthy; and
creating automatically by the data processing system a second exception for the second trust failure in response to determining that the first exception applies to the second trust failure, and wherein the second exception allows establlishing the untrustworthy second communication.

5. The machine-readable non-transitory storage medium of claim 4, wherein the data processing system determines whether to create the second exception without requiring user interaction to create the second exception.

6. The machine readable non transitory storage medium of claim 5, wherein the data processing system determines whether to create the second exception by comparing the first trust failure and the second trust failure, and the comparing comprises comparing a context of the first trust failure and a context of the second trust failure.

7. A data processing system, comprising:
a processor; and
a memory configured to store instructions that when executed by the processor, cause the processor to perform steps that include:
storing first data representing a first exception to a first trust failure, the first trust failure indicating, prior to establishing a first communication with the data processing system, that the first communication is untrustworthy, wherein the first exception allows the data processing system to establish the untrustworthy first communication;
determining, as part of establishing a second communication with the data processing system, that a second trust failure has occurred, the second trust failure indicating that the second communication is untrustworthy; and
creating automatically by the data processing system a second exception for the second trust failure in response to determining that the first exception applies to the second trust failure, and wherein the second exception allows establishing the untrustworthy second communication.

8. The data processing system of claim 7, comprising determining whether to create the second exception without requiring user interaction to create the second exception.

9. The data processing system of claim 7, comprising determining whether to create the second exception by comparing the first trust failure and the second trust failure, and the comparing comprises comparing a context of the first trust failure and a context of the second trust failure.

* * * * *

UNITED STATES PATENT AND TRADEMARK OFFICE
CERTIFICATE OF CORRECTION

PATENT NO.         : 8,739,292 B2
APPLICATION NO.    : 12/347691
DATED              : May 27, 2014
INVENTOR(S)        : Mitchell D. Adler et al.

Page 1 of 1

It is certified that error appears in the above-identified patent and that said Letters Patent is hereby corrected as shown below:

In the Claims:

Column 10, line 19 (Claim 4, line 21): "establlishing" should read --establishing--.

Column 10, line 25 (Claim 6, line 1): "non transitory" should read --non-transitory--.

Column 10, line 56 (Claim 9, line 1): "claim 7," should read --claim 8,--.

Signed and Sealed this
Thirtieth Day of September, 2014

Michelle K. Lee
*Deputy Director of the United States Patent and Trademark Office*